March 17, 1964  S. S. HELD  3,125,696
ELECTRIC TIMEPIECE REGULATING MECHANISM
Filed Nov. 23, 1960  3 Sheets-Sheet 1
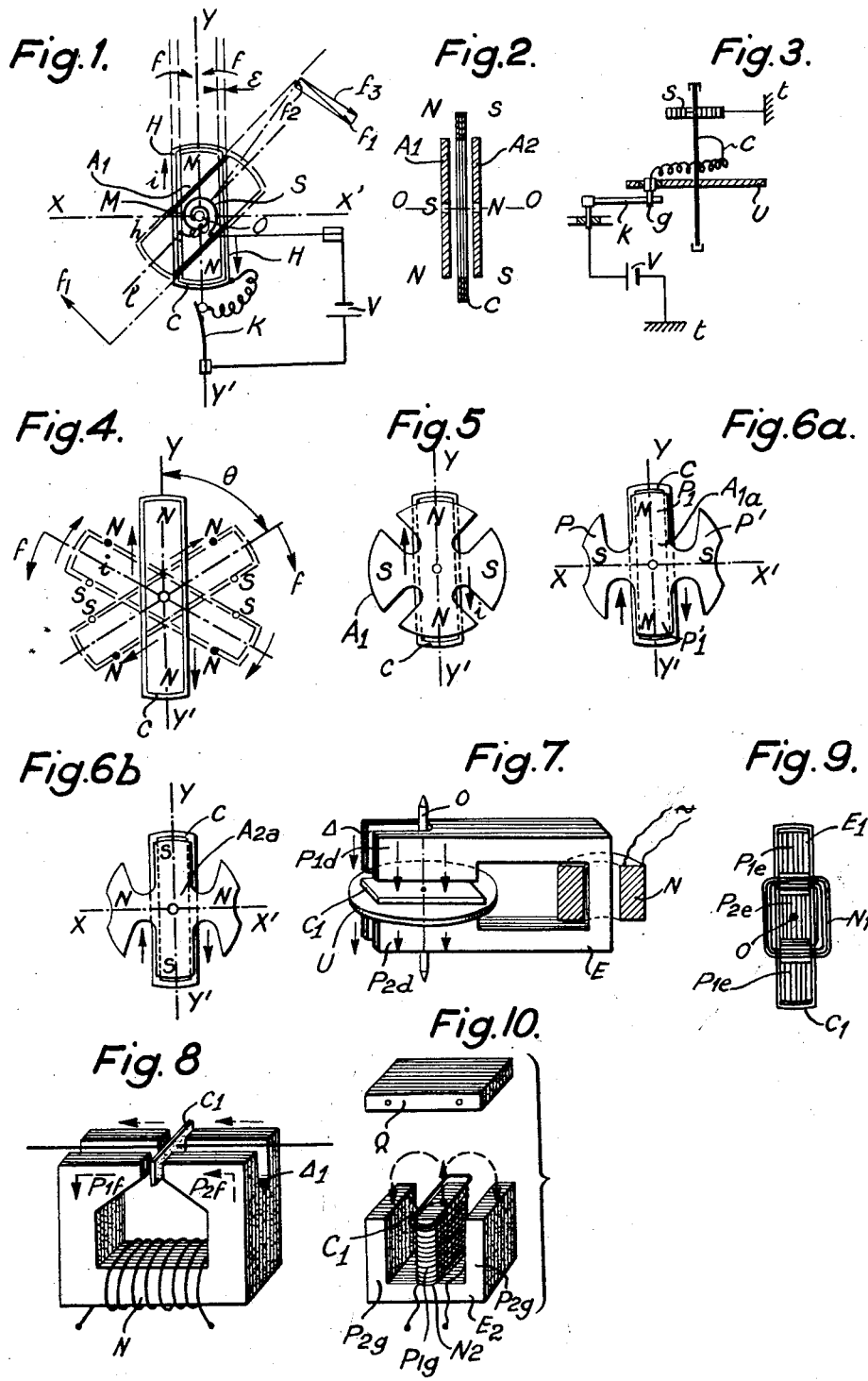

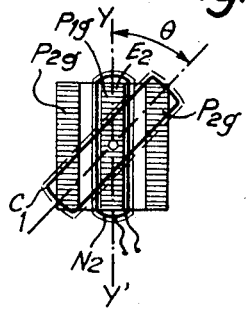
Fig.11.
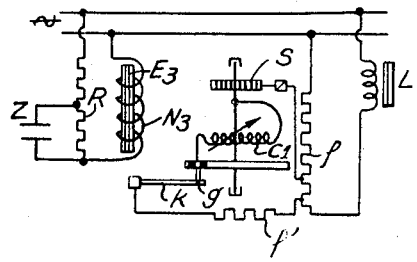
Fig.12.
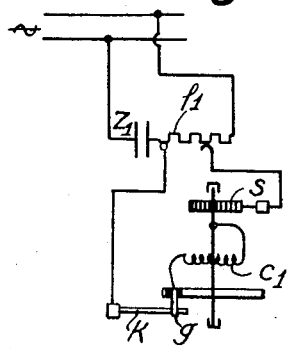
Fig.13
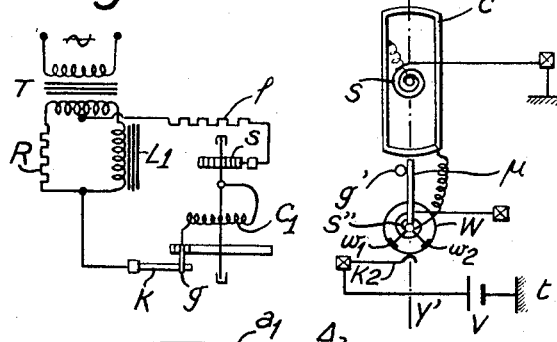
Fig.14.
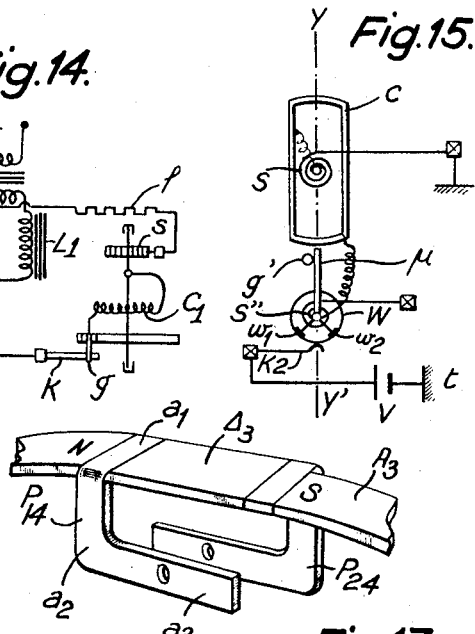
Fig.15.
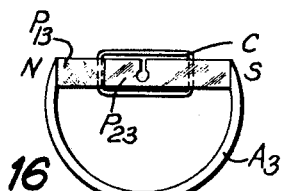
Fig.16
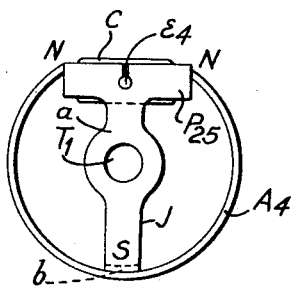
Fig.17a.
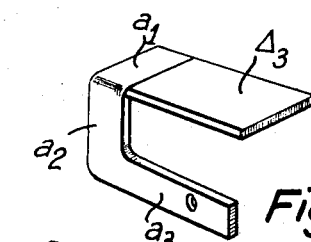
Fig.17b.
Fig.18a.
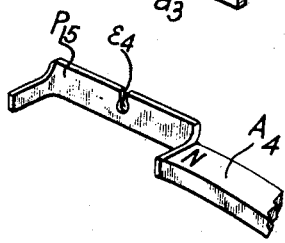
Fig.18b.

3,125,696
ELECTRIC TIMEPIECE REGULATING
MECHANISM
Simon Serge Held, Paris, France, assignor to Societe Anonyme Etablissements Ed. Jaeger, Levallois-Perret, Seine, France
Filed Nov. 23, 1960, Ser. No. 71,343
Claims priority, application France Sept. 2, 1954
15 Claims. (Cl. 310—36)

This patent application is a continuation-in-part of my earlier patent application Serial No. 531,340, filed August 30, 1955, now abandoned, for "Oscillating Electromagnetic Device for Regulating and Sustaining the Movements of a Clockwork," and certain parts of the present application will be found in the earlier application.

The present invention relates to an electric movement intended to sustain and regulate the movements of a clockwork, of the type comprising an oscillating balance-wheel and a frame-coil secured on a spindle connected to a spiral spring, said frame-coil being movable in a magnetic field so that it cuts across the flux thereof, thereby causing said spindle to oscillate by impulses of electric current in said coil generated by the periodic closing of a supply circuit, the periodical motive impulses applied to said spindle being used for driving in a constant direction by any known means the first wheel of the gear train.

The main object of the present invention is to provide a regulating and sustaining electric movement of the general type indicated hereinabove wherein the frame-coil consists of a single flat coil of elongated rectangular configuration, the winding of which is disposed at right angles to the oscillating spindle axis, while its center of symmetry and of gravity coincides with said axis, said winding being carried by a non metallic frame secured on said spindle and being connected at its two ends to the same pole of an electric current source in both directions of oscillation as its great axis passes very close to the axis of static equilibrium for which no torsional moment is impressed to the spiral spring, during a short time with respect to the period of oscillation of the balance-wheel, said winding oscillating within its proper plane through the gap of a stationary closed magnetic or electromagnetic circuit having through said axis of static equilibrium a magnetic flux the direction of which is opposite to that of the electromagnetic flux generated by the energized coil and through an axis at right angles to said static equilibrium axis and to the spindle, a magnetic flux so directed and of such a value that the total flux passing through said energized coil in the direction of its electromagnetic flux when moving away from said static equilibrium position is increased. The magnetic flux through the axis at right angles to the static equilibrium axis is either substantially zero or reversed with respect to the magnetic flux through said static equilibrium axis, i.e. has the same direction as that of the energized winding flux in the last case.

Thus the winding is submitted to two motive impulses per period and supplies twice per period the power which is necessary for driving the gear train, very close to its position of static equilibrium, which complies with the optimum isochronism requirements. In this respect a movement of the general type indicated hereinabove and constructed in accordance with the principles of this invention will operate in the fashion of a mechanical clock having its movement sustained by an anchor or recoil escapement, and offers the substantial advantage of utilizing forces having a lesser variability than those derived from a spring-drum.

As the driving system does not comprise any soft-iron parts, the only losses produced are due to the Joule effect which is proportional to the square of the current. Therefore, it is more advantageous to have two current supplies per period of oscillation of the balance-wheel than a single supply.

Further, when the contact which feeds the winding is closed, said winding is submitted to forces tending to remove it from the static equilibrium axis through which it is submitted to a magnetic flux opposed to its own electromagnetic flux and to bring it nearer to the perpendicular axis through which said magnetic flux is either substantially zero or reversely directed, while being equally urged on either side of said static equilibrium axis to move towards said perpendicular axis. Said winding obligatorily follows the direction given to it by the balance-wheel to which it is connected, provided that a complete symmetry of action in the four sectors defined by said two axes exists.

For this purpose, the stationary closed magnetic circuit comprises on one side of the frame-coil, along the axis of static equilibrium, either one main pole piece through which the oscillating spindle passes centrally or two main pole pieces of same polarity disposed symmetrically with respect to said oscillating spindle, said main pole piece or pieces generating a magnetic flux the direction of which is opposite to that of the energized winding electromagnetic flux, and having a width substantially equal to that of the mean turn of the winding, and, along the axis perpendicular to said static equilibrium axis either no pole piece or two auxiliary pole pieces disposed symmetrically with respect to the axis of the spindle and having the same polarity but reversed to that of the main pole piece or pieces, the profile of said auxiliary pole pieces being determined so that the winding penetrates the magnetic flux generated thereby before said winding be deenergized, the flux of each main and auxiliary pole piece being closed on the other side of the frame-coil either through a closing pole piece of reversed polarity, or through a closing armature made of soft-iron or laminated iron according as the main and auxiliary pole pieces belong to a permanent magnet or to an electromagnet, each closing pole piece or armature having the same width or profile as the relevant main or auxiliary pole piece. When two auxiliary pole pieces are used a very rapid increasing of the driving torque is obtained from the energization of the winding up to a maximum. Said auxiliary pole pieces chiefly act for lengthening in time the efficiency of the driving torque, for increasing said torque, for extending the maximum torque on either side of the position in which the feeding contact is closed in order to take advantage of the most favorable part of the torque curve between the times of closure and opening of said contact, and for increasing the counter-electromotive force, which is a function of the speed in the variation of the pole flux generated by the stationary parts and of the change in the direction of said flux, which increasing of the counter E.M.F. improves the regulation and eliminates any sparking when the current is cut off.

Other features and advantages of this invention will appear as the following description proceeds with reference to the attached drawings forming part of this specification and illustrating diagrammatically by way of example a few forms of embodiment thereof.

In the drawings:

FIGURE 1 is a schematic plan view of an electric movement formed by two permanent elongated rectangular magnets of reversed polarities having respectively two end poles of the same polarity and a central consequent pole of opposite polarity and forming a closed magnetic circuit through which moves a flat elongated rectangular winding pivotally mounted around an axis perpendicular to said magnets.

FIGURE 2 is a cross-section of FIG. 1 taken along line Y—Y'.

FIGURE 3 is a schematic electrical supplying diagram for the embodiment illustrated in FIGS. 1 and 2.

FIGURE 4 is a schematic plan view of an electric movement comprising a main magnetic field generator and an auxiliary magnetic field generator.

FIGURE 5 is a schematic plan view of an electric movement wherein the field generator comprises two quadripolar magnets having approximatively the shape of a Geneva cross.

FIGURES 6a and 6b are schematic plan views of two quadripolar magnets to be used in the embodiment illustrated in FIG. 4.

FIGURE 7 is a schematic perspective view of an electric movement of the type illustrated in FIG. 1 wherein the field generator comprises an electro-magnet.

FIGURE 8 is a schematic perspective view of another embodiment of the device illustrated in FIG. 7.

FIGURE 9 is a schematic plan view of another embodiment of the electric movement illustrated in FIG. 7.

FIGURE 10 is a schematic perspective view of an electric movement of the type illustrated in FIGS. 4 to 6b wherein the magnetic field generator comprises an electro-magnet.

FIGURE 11 is a plan view of the electric movement illustrated in FIG. 10.

FIGURE 12 is a schematic electrical diagram for supplying with alternating current the movements illustrated in FIGS. 7 to 11.

FIGURES 13 and 14 are two other schematic electrical diagrams for supplying with alternating current the movements illustrated in FIGS. 7 to 11.

FIGURE 15 is a schematic plan view of a contact arrangement and a schematic diagram for supplying with direct current through said contact arrangement the movements illustrated in FIGS. 1, 2 and 4 to 6b.

FIGURE 16 is a schematic plan view of an electric movement for wrist-watches wherein the magnetic field generator comprises a permanent magnet shaped as an open ring, having two poles of reversed polarities and two facing pole pieces.

FIGURES 17a and 17b illustrate schematically a type of embodiment of the magnetic and soft iron parts of the movement illustrated in FIG. 16.

FIGURE 18a is schematic plan view of an electric movement for wrist-watches wherein the magnetic field generator comprises a permanent magnet shaped as an open ring and having two end poles of the same polarity, a consequent pole of the reversed polarity and two facing pole pieces.

FIGURE 18b illustrates schematically a first type of embodiment of the magnetic and soft iron parts of the movement illustrated in FIG. 18a.

Figure 20:
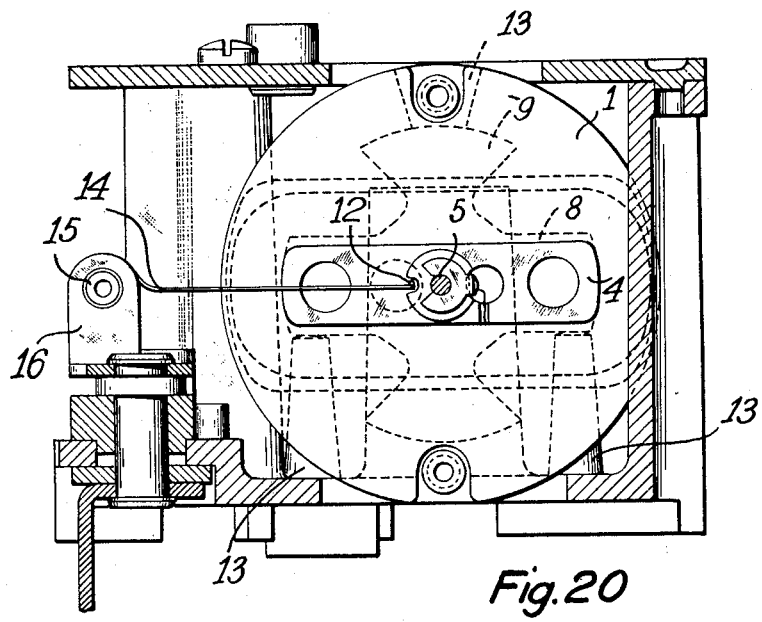
FIGURE 20 is a cross-section of FIG. 19 taken along line XX—XX.

Assuming a circuit through which a current of $i$ amperes circulates, which is positioned in a magnetic field and passes from one position in which a magnetic flux $\phi_1$ flows through the circuit to another position in which this magnetic flux becomes $\phi_2$, the work T produced by the forces involved is in Joules: $T = 10^{-8}(\phi_2 - \phi_1)i$.

This circuit will be self-operating and produces work if the displacement increases the total flux in the direction of the electromagnetic flux produced by the current circulating therethrough. Considering the mechanical connections involved, the position is stable at the highest total flux value and unstable at the minimum total flux value. Consequently, to produce two spontaneous displacements in two opposite directions, the circuit must be able to be urged from a position wherein the total flux as defined is minimum to two other symmetrically disposed positions of increasing total flux and relative maxima.

The higher the total flux variation corresponding to the angular variation (if a rotation is involved), the higher the forces or torques, and it will be advantageous to cause the contact time to correspond to the region wherein the total flux variation occurs at the fastest rate so as to obtain a steep rise and a high counter-E.M.F. so as to eliminate practically any sparking. From the arrangement illustrated diagrammatically in FIGS. 1 to 3 it is apparent that these requirements are complied with.

In these figures, C is a rectangular frame-coil or winding with thin wire and having a rectangular configuration of height $h$ and width $l$, the surface of this frame-coil being at right angles to the axis of rotation 0; the width of the coil turns in the plane is $e$. Y—Y' designates the axis corresponding to the position of static equilibrium of the balance-wheel spiral spring S, at which the angular velocity has its maximum value during the dynamic period and no torsional moment is impressed to said spiral spring. The frame is movable within the narrow gap formed between a pair of magnets $A_1$, $A_2$ (shown in section in FIG. 2) of rectangular shape, having a width substantially equal to that of winding C and poles of same polarity but reversed from the one to the other, as shown, and the great axis Y—Y' of which coincides with the axis of static equilibrium for the balance-wheel. In the example of FIGS. 1 and 2, each magnet has a consequent pole in its central region which has no appreciable influence on the operation of the assembly, the end poles having a preponderant function. Said magnet generates a magnetic flux which has relative maximum and minimum values respectively through axis Y—Y' and through an axis X—X' at right angles to said axis Y—Y'. When the frame-coil C registers with or covers the polar surface it receives a magnetic flux passing at right angles through its surface. In all the figures it is assumed for the observer that the frame-coil overlies one of the magnets $A_1$ for example of North polarity, the current $i$ flowing therethrough in the clockwise direction; the $A_2$ magnet or the soft-iron yoke completing the magnetic circuit (FIG. 2) is not shown in FIG. 1 for the sake of clarity. It will be readily understood that according to ruling conventions the directions of the magnetic field and of the electromagnetic field generated by the energized winding are opposed to each other. Therefore, the total flux in the direction of the electromagnetic flux produced by the energized winding is minimum in the position corresponding to an exact superposition of the surfaces for which the magnetic flux has a maximum relative value. In this position, magnetic equilibrium is unstable. If the frame-coil C is moved away from this position in one or the other direction, it is urged immediately by a torque towards the position of stable magnetic equilibrium wherein due to the fact that the magnetic flux has a relative minimum value the total flux passing therethrough in the direction of the electromagnetic flux produced by the energized winding is maximum, i.e. a position in which the frame coil would tend to form a cross with the magnet for coinciding its longitudinal axis with the axis X—X' if the current supply were not discontinued. The faintest pivotal displacement with respect to the static equilibrium axis Y—Y' will initiate a torque in the direction of movement, i.e. in the direction of oscillation of the balance-wheel. The end poles of the magnet act as repulsion poles for the winding. This type of magnet will be termed hereinafter magnet of the rectangular type. The electrical connections are shown in FIGS. 1 and 3. The winding C has one end connected to the earth $t$ through the regulating spiral spring S and the other end connected to the pin $g$ carried by the balance-wheel U and insulated from the earth; the battery V has one terminal connected with the earth and the other terminal conected with a flexible blade K. This blade K is coincident with the axis Y—Y' of static equilibrium of the balance-wheel close to which the contact takes place and can be easily adjusted for its duration by extending more or less the blade K in the axial direction.

It is well to consider the elementary actions exerted on the bunch of conductors, these actions producing of course the same results as the aggregate law while affording a clearer understanding of the properties of the apparatus, notably in the embodiment shown in FIG. 4 which proved eminently satisfactory in actual service. Referring to FIG. 1, let us consider the two longitudinal bunches of wires H of which the mean turn reproduces the magnet contour. To obtain the desired operation both longitudinal bunches of wires H must be subjected to two equal forces $f$ of opposite directions so that each bunch tends to move out from the gap on the side opposite to that in which it is positioned. If the winding is deflected as shown in the clockwise direction, the bunch located on the left-hand side of the axis Y—Y' will engage the gap and the right-hand bunch will move out therefrom towards the axis X—X'. The active conductors shown in thick lines will therefore be subjected to two forces $f_1$ in the clockwise direction, the residual torque in the oppositely-directed portions (in thin lines) remaining negligible. If the winding were inclined in the opposite direction, the reverse would occur and the torque would be supplied by the conductors shown in thin lines. It is apparent that upon each contact and as soon as the axis Y—Y' is cleared both longitudinal half-sides of the rectangular winding become operative to produce a moment in one direction while reversing their functions in the other direction. It will be noted that the force $f_1$ at right angles to the conductors consists of a force $f_3$ perpendicular to one diameter and of a small force $f_2$ in the axial direction, which is cancelled. Thus, it would be advantageous to locate the conductors nearer to the centre for increasing the moment. Yet with a very narrow rectangular winding the difference between the fields along each larger side would become imperceptible inasmuch as the polar fringes are such that the field is not delimited very exactly by the pole contours although the gap does not exceed two millimeters. If the ratio $h/l$ approaches the unity, the torque decreases and is practically zero in the case of a square frame. For predetermined gap and bunch widths there is an optimum $h/l$ ratio and the following values must be approached: $h=3l$ and $\epsilon=l3$, the mean turn delimiting the polar contour.

Said electrical movements present great advantages with respect to the conventional electric movements. The existing movement having flat windings comprise either two coiled frames located on either side of the oscillation axis or a single coiled frame located on one side of said axis and associated with a counterweight. In the last case the efficiency is reduced by half owing to the fact that there is a single coiled frame and that the moment of inertia increases. In the first case it seems at first view that the movement with a single flat winding according to the invention is only advantageous by its simplicity and by the resulting decreasing in the cost price. However, the windings of the movements with two coiled frames have generally a circular shape by virtue of the mechanical resistance of the copper wire and therefore the ratio between the operative and inoperative parts of said circular windings approximates 50%. Such a ratio is considerably increased for the single flat winding of the invention while the construction of said flat winding is more easy and the resulting torque exceeds that obtained by the conventional movements with two coiled frames by about 25%.

In order to increase both efficiency and output it is endeavoured to render both bunches H operative throughout their lengths as regard the forces exerted by the magnetic field. FIG. 4 illustrates diagrammatically the polar structure derived from the elementry law governing the actions exerted by a field on a conductor wound in a rectangular shape. Considering a rectangular-shaped conductor C pivoted about its center and receiving a current $i$, a toque will be obtained when the two longitudinal portions of the conductor on either side of the conductor axis are subjected to two magnetic fields N and S at right angles to the surface thus swept and between each other, which have opposite direction and extend on either side of the axis. If we apply Ampere's rule for the direction of current considered the polarities of FIG. 4 producing two forces $f$ of opposite directions are those indicated for an angle $\theta$ of the order of from 35° to 45° corresponding to the contact time in the case of a balance-wheel beat of 270°. By merging the poles of same polarities a magnet is obtained which has the contour shown in FIG. 5, i.e. an approximate contour of Geneva cross.

The fact that a high initial angular coefficient is mostly desirable for the torque curve, on the one hand, and that the maximum torque should preferably correspond to the angular portion in which the contacts engage each other, due allowance being made for the counter-E.M.F. which deforms the torque pattern by decreasing this torque, on the other hand, has led to the magnet form illustrated in FIG. 6a which corresponds substantially, in the dimensions shown, to the highest requirements concerning the operation, efficiency and power consumption, so that this device may compete favourably with the best gravity balance-wheel electric clocks. Said magnet has along the axis Y—Y', axis of static equilibrium, an elongated rectangular shape coinciding with that of the mean turn of the winding and having two end main North poles $P_1$ and $P'_1$, and along the axis X—X' at right angles to axis Y—Y' a fish tail shape the angular development of which is determined so that the winding penetrates the magnetic flux generated by the auxiliary South poles P, P' disposed on said axis X—X' before its energization ceases. The magnet $A_{2a}$ of FIG. 6b is a reproduction with reversed poles of the magnet $A_{1a}$ illustrated in FIG. 6a and is placed exactly in front thereof, the frame-coil C sliding in the gaps of the pair of magnets involved. Of course, a soft-iron plate of same contour may be substituted for one of the magnets illustrated in FIGS. 6a or 6b.

The magnet of this type, as illustrated in FIG. 6a, generates a magnetic flux which has relative maximum and minimum values respectively through said axes Y—Y' and X—X'. Consequently the winding C being energized when its longitudinal axis coincides with the axis Y—Y' so that its electromagnetic flux is opposed to the magnetic flux of poles $P_1$ and $P'_1$, the total flux passing therethrough in the direction of said electromagnetic flux has a minimum value for said position of coincidence corresponding to an unstable magnetic equilibrium and is urged immediately by a torque towards the position of stable magnetic equilibrium, i.e. towards the axis X—X' for which the magnetic flux has a minimum relative value and therefore the total flux would be maximum in the direction of the electromagnetic flux produced by the energized winding if the current supply were not discontinued. The poles $P_1$ and $P'_1$, act as repulsion poles while the poles P and P' act as attraction poles. This type of magnet will be termed hereinafter "magnet of the Geneva cross type."

In the various arrangements shown in FIGS. 1 to 6b it will be readily understood that the assembly has a stacked or sandwich-like structure in that the frame-coil C is movable between a pair of magnets of opposite polarities so as to form a closed magnetic circuit, but it is also possible to utilize a single magnet by closing the magnetic circut through a soft-iron member of exactly the same shape, the magnet determining by induction reverse polarities as in the case of a pair of superposed magnets.

FIGS. 7 to 11 illustrate diagrammatically the constructional arrangements employed for supplying the device with alternating current. The principle is the same as in the case of a D.C. feed with magnets, except that the magnet is replaced by an electromagnet connected directly and permanently to the source of alternating current; the frame-coil is of same design and fed with alternating current; this apparatus operates as a ferro-dynamic electrodynamometer but the electromagnet flux and frame-coil flux must be in opposition in the initial position of instable magnetic equilibrium.

In FIG. 7, E designates the laminated frame of an electromagnet energized through a coil N. The coiled frame $C_1$ connected to the balance wheel U is displaceable between the pole pieces $P_{1d}$ and $P_{2d}$ in which a notch $\Delta$ is formed to permit the insertion and positioning of the movable gear or unit; this device operates in the manner described in connection with FIG. 1. The same applies to FIG. 9 showing a constructional arrangement corresponding to that illustrated in FIG. 2 since the coil $N_1$ mounted on the central leg of a triple pole electromagnet $E_1$ forms on the intermediate portion a pole $P_{2e}$ and at the extremities two reversed poles $P_{1e}$ of same signs, the direction of the flux at these two poles $P_{1e}$ being opposite to that generated by the frame-coil $C_1$. With this arrangement the magnetic circuit is closed by a yoke provided at the upper portion of the device and not shown in the drawing for the sake of clarity. FIG. 8 is similar to FIG. 7 and shows clearly the feature whereby the notch $\Delta_1$ formed in the pole pieces $P_{1f}$ and $P_{2f}$ in the central portion of the frame and through which passes the pivotal axis of frame-coil $C_1$ does not reduce the electro-dynamic torque to any appreciable extent. The devices of FIGS. 7 to 9 act as magnets of the rectangular type.

FIG. 10 is an isometric view and FIG. 11 a sectional view taken upon the plane of the frame-coil $C_1$ illustrating a constructional arrangement employing an electromagnet which acts as a magnet of the Geneva cross type such as those shown in FIGS. 5, 6a, and 6b. The laminated soft-iron electromagnet $E_2$ is a three-legged member wherein the intermediate leg $P_{1g}$ corresponds to the position of unstable magnetic equilibrium, the lateral portions $P_{2g}$ corresponding to the position of stable magnetic equilibrium, a yoke Q closing the magnetic circuit. The frame-coil $C_1$, as in any of the preceding arrangements, is inserted in a thin circular plate of insulating material pivotally mounted in a bearing secured centrally of the member $P_{1g}$, as illustrated in FIG. 11; the frame-coil $C_1$ is movable on either side of the axis Y—Y' towards the poles $P_{2g}$ in either direction. The polar surface $P_{1g}$ is repulsive and both polar surfaces $P_{2g}$ are attractive.

To obtain a satisfactory operation the current fed to the electromagnet and the current flowing through the frame-coil must be in opposition; to this end they must be adjusted beforehand so as to be in phase. FIG. 12 shows by way of example an arrangement wherein the winding $N_3$ of the electromagnet $E_3$ is connected in series with a resistor R having one portion adapted to be short-circuited by a capacitor Z; the movable frame-coil $C_1$ connected to the spiral spring S is in series through the pin g and the flexible blade K with a resistor $\rho'$ and shunted across the terminals of another resistor $\rho$ connected permanently across a source of alternating current with a choke coil L in series; thus, the phasing is obtained by reducing the phase lag of the electromagnet coil and imparting a phase lag to the current flowing through the frame-coil. The voltage applied to the frame-coil and fed by a portion of the potentiometer resistor $\rho$ may be of the order of about two volts; under these conditions, the contact may be established without any appreciable sparking as in the D.C. arrangement since the self-inductance of the frame-coil is extremely low. It is also necessary to make due allowance for the electromagnet flux induction effect in the frame-coil $C_1$ because as the contact is effected the frame-coil, its resistor $\rho'$ and the resistor portion of the potentiometer $\rho$ constitute a closed circuit. The induction torque is extremely low because the time constant of the frame-coil is also very low, so that the induced current is shifted through about 90° with respect to the induction field, but even if the contrary took place there would be a repulsive action on either side of the Y—Y' axis so that this action would add itself to the electrodynamic torque and tend to reject the frame-coil away from the pole $P_1$ of the electromagnet; on the contrary, this action is subtracted from the electrodynamic torque in the direction of the pole $P_2$. Thus, the induction effect promotes the impulsive torque in the case of repulsive poles (see FIGS. 7 to 9). The induced voltage creates a very low circulation current in the frame-coil which has a negligible influence on sparking.

It is obvious that the current circulating in this frame-coil may be phased with the electromagnet flux by either phasing the frame-coil current with the voltage and similarly phasing the current in the electromagnet, or shifting the electromagnet current by 90° and also the frame-coil current by 90°. For example, in FIG. 13 the frame-coil $C_1$ is connected across the terminals of a small resistor $\rho_1$ in series with a capacitor $Z_1$, this resistor-capacitor unit being connected across a source of alternating current, so that the current in the frame-coil will have a lead of substantially 90° with respect to voltage, and the winding N of the electromagnet may be connected directly to the voltage without any intermediate series resistor.

If a precise phasing were desired it would be possible to provide a small simple phase-shifting device having connected the frame-coil $C_1$ across its terminals. Besides, if a two-phase or three-phase A.C. source is available it is a very simple matter, by using adequate resistors, to phase the two feed currents within extremely accurate limits. It is also possible to provide a small transformer with series-connected resistors in its primary and secondary windings, and so arranged as to produce across the secondary terminals a voltage having a lead of about 90°. By way of example, FIG. 14 illustrates an arrangement comprising a transformer T having its secondary adapted to feed a resistor R and a self-inductance $L_1$; the frame-coil $C_1$ in series with a resistor $\rho$ is connected to an intermediate tapping point on the secondary, on the one hand, and between the resistor R and the self-inductance $L_1$, on the other hand. Under these conditions, by properly adjusting the ratio $R/L_1$, it becomes possible to shift the current circulating in the frame-coil to any desired phase lag or lead with respect to the voltage while maintaining the voltage at the frame-coil terminals to a constant value.

Finally, a capacitor may be used to bring the electromagnet winding N to a state of resonance at the intermediate frequency, so that it becomes possible, on the one hand, to permit the maximum current commensurate with the heating to flow through this winding and, on the other hand, to connect the frame-coil $C_1$ with an ohmic resistor.

FIG. 15 illustrates an improved arrangement of the blade contact K and pin g of FIGS. 1 and 3, with a view to enable the current to be fed only when the axis of static equilibrium Y—Y' is cleared by the frame-coil in one or the other direction.

In fact, it is advantageous that the electric contact takes place exactly on the neutral line of zero electrodynamic torque and preferably in the period wherein this torque begins to rise, i.e. when the frame-coil initiates its deflection, which is not the case in the arrangement of FIG. 3 since the pin g has a minimum diameter and the contact takes place slightly before in one or the other direction. The desired result is obtained irrespective of the pin diameter, as shown in FIG. 15, wherein W is a small insulating cylinder carrying a pair of conducting blades $w_1$ and $w_2$ separated by the insulating material of the cylinder and connected electrically to the lead-in of the frame-coil C, and $K_2$ is a resilient conducting blade like that shown in FIGS. 1 and 3.

The insulating cylinder W is pivotally mounted and urged by a small spiral spring S" to a position in which its diameter passing midway between the conducting blades $w_1$, $w_2$ merges in the axis Y—Y'; this cylinder W carries a small rod $\mu$ adapted to be driven in one or the other direction by the pin $g$ rigid with the balance-wheel.

From the foregoing it is apparent that in one direction of oscillation the small rod $\mu$ is deflected and for a predetermined angle the contact takes place through $K_2$ and $w_1$ in one direction and through $K_2$ and $w_2$ in the other direction. The small rod $\mu$, at a given point of the balance-wheel movement, will escape from the pin $g$ and the spiral spring $S''$ will restore the small rod to its initial position in alignment with the axis Y—Y', the contact being then broken.

FIGURES 16 to 18$b$ illustrate various types of embodiment of an electric movement more particularly adapted for wrist-watches. In such wrist-watches the watch movement proper fills almost the inner capacity of the casing and the permanent magnet or magnets consist of members formed by an open ring or open annular element, said members being located close to the inner cylindrical surface of the casing around the watch movement in order to set free the part of said casing which is necessary for housing the balance-wheel and the gear train.

In the embodiment shown in FIG. 16, the permanent magnet $A_3$ consists of an open ring having end poles of reversed polarities. Said poles carry pole pieces $P_{13}$ and $P_{23}$ made of soft-iron between which the frame-coil C moves.

The embodiment illustrated in FIGS. 17$a$ and 17$b$ differs from that illustrated in FIG. 16 by the fact that the spindle of the balance-wheel is located in the space limited by the open magnet $A_3$. For this purpose each pole piece $P_{14}$ and $P_{24}$ consists of a piece of soft-iron which is successively bent according to three perpendicular directions for forming faces $a_1$, $a_2$ and $a_3$ which are perpendicular and orthogonal between each other, the face $a_1$ being connected to magnet $A_3$ in any known manner. An element $\Delta_3$ made of a magnetic material is interposed between the pole pieces $P_{14}$ and $P_{24}$ for closing the open ring formed by magnet $A_3$.

In the embodiment shown in FIGS. 18$a$ and 18$b$, the permanent magnet $A_4$ consists of an open ring the ends of which form two poles having the same polarity, said magnet having an intermediate consequent pole of reversed polarity.

As schematically illustrated in said FIGS. 18$a$ and 18$b$ the north poles are interconnected by a rectangular pole piece $P_{15}$ of soft-iron laterally disposed with respect to the diametral plane of magnet $A_4$. On the part of said magnet forming the consequent south pole is secured a branch piece J of soft-iron diametrically directed with respect to magnet $A_4$ and ending by a rectangular portion $P_{25}$ reproducing the shape of pole piece $P_{15}$. Frame-coil C moves between pole piece $P_{15}$ and part $P_{25}$ of branch piece J. As shown in FIG. 18$a$ the branch piece J is formed with a plate bent at right angles for obtaining a base $b$ secured on the inner cylindrical surface of magnet $A_4$ while its part $a$ is provided with a central hole $T_1$ through which passes the minute shaft. The pole piece $P_{15}$ and part $P_{25}$ of branch piece J are formed with notches $e_4$ through which passes the balance-wheel spindle.

The devices illustrated in FIGS. 16 to 18$b$ act as magnets of the rectangular type.

Figure 19:
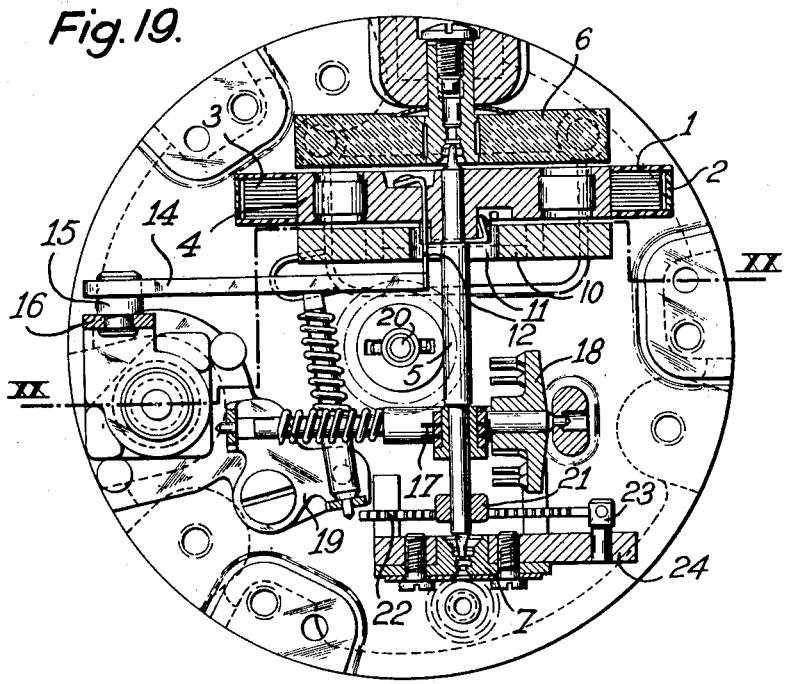
FIGURE 19 is an elevational and axially sectional view of an electric watch according to the invention.

The watch shown in FIGS. 19 and 20 comprises a frame or former wound with copper wire. Said former comprises a disk 1 of insulating material, preferably of synthetic resin such as those of the polyamid or acetobutyrate class. Said disk 1 covers a member 2 of the same insulating material having a rectangular core limited by a rectangular groove housing the winding 3. Disk 1 and member 2 are secured on the balance wheel 4 by means of rivets not shown. Said former and balance wheel are supported by the balance wheel spindle 5 which pivots, on the one hand, on a permanent fixed magnet 6 disposed on one side of the former and, on the other hand, on a bridge 7.

The magnet 6, as shown in FIG. 20 is of the Geneva cross type illustrated in FIGS. 6$a$ and 6$b$ and comprises a rectangular part 8 having two poles of same polarity and the shape of which is similar to that of winding 3 and two fish tail-shaped enlargements 9 having two poles of reversed polarity with respect to those of said rectangular part and the axis of which is perpendicular to the greater sides of said rectangular part. On the opposite side of said former with respect to said magnet is disposed a plate 10 of soft-iron having the same profile as said magnet and formed with a bore 11 through which pass the spindle 5 and a pin 12 carried by the balance wheel 4. The magnet 6 is supported by pillars 13 secured on the frame of the watch while the plate 10 is directly supported by said frame.

At each half oscillation of the balance wheel, when the pin 12 passes on the greater axis of the rectangular part 8 of magnet 6, said pin comes in contact with a flexible blade 14 which at rest coincides with said axis and remains in contact with said blade during an angular displacement substantially equal to 40°. Said blade is connected to the source of current and is secured on a support 15 of insulating material attached to a bridge 16.

On spindle 5 lifts 17 are attached for driving the watch movement proper through a driving wheel 18, an intermediate transmission 19 and the center shaft 20. On this spindle is also secured a ring 21, used for the fixation of one end of a spiral spring 22 the other end of which is attached to a finger 23 associated with a regulating lever 24 used for the adjustment. The power supply for the chrono-electrical movement is effected according to the diagram shown in FIGURE 3.

What I claim is:

1. In a movement for electric time pieces, such as clocks and watches, of the type in which a pivoted driving spindle, connected to a spiral spring and carrying a balance wheel and a frame-coil movable in a magnetic field so that its winding cuts across the flux thereof, is caused to oscillate by impulses of electric current in the winding generated by the periodic closing of a supply circuit for said winding, the movement of said spindle being changed to an intermittent motion of constant direction in the time piece by any known means; the improvement which comprises, in combination, a frame-coil consisting of a single flat coil of elongated rectangular configuration, the winding of which is disposed in a plane perpendicular to the driving spindle while its center of symmetry and of gravity is located on the axis of said spindle, and a non metallic frame secured on said spindle and carrying said winding; an electric current source, means for connecting the two ends of said winding respectively to the same pole of said electric current source during a short fraction of the oscillation period of said winding in both directions of oscillation very close in advance to the time when the greater axis of said rectangular winding coincides with the axis of static equilibrium of said balance wheel for which no torsional moment is impressed to the spiral spring; and a stationary closed magnetic circuit the outline of which reproduces at least in one of its parts the rectangular outline of said winding and through the gap of which said winding oscillates within its proper plane, the magnetic flux of said circuit presenting relative maximum and minimum values respectively through said axis of static equilibrium and through an axis perpendicular to the latter and to the spindle, the direction of said magnetic flux through said static equilibrium axis being opposite to that of the electromagnetic flux generated by the energized winding.

2. A movement according to claim 1, wherein the width of the single elongated rectangular winding is substantially equal to the third of the length thereof while the width of the winding turns is substantially equal to the third of the winding width.

3. A movement according to claim 1, wherein the frame is made of insulating material.

4. A movement according to claim 1, wherein the magnetic flux of the magnetic circuit through the axis perpendicular to the axis of static equilibrium is substantially zero.

5. A movement according to claim 1, wherein the magnetic flux of the magnetic circuit through the axis perpendicular to the axis of static equilibrium has a reversed direction with respect to that of said magnetic flux through said static equilibrium axis.

6. A movement according to claim 1, wherein the means for energizing the winding, comprises a source of current one pole of which is connected to the fixed end of the spiral spring the movable end of which is connected to the spindle, a line connecting the spindle to one end of said winding, an insulated pin mechanically connected to the coiled frame and electrically connected to the other end of said single winding, and an insulated conductive flexible blade directed at rest along the axis of static equilibrium and connected to the other pole of the current source.

7. A movement according to claim 1, wherein the electric source of current is a direct current source and wherein the stationary closed magnetic circuit comprises a rectangular permanent magnet with end poles of same polarity, centered on the spindle axis to which it is perpendicular and disposed on one side of the rectangular winding, and on the other side of said winding an element adapted to close the flux generated by said end poles and having the same outline as said magnet, said outline reproducing the rectangular outline of said winding.

8. A movement according to claim 1, wherein the electric source of current is a direct current source and wherein the stationary closed magnetic circuit comprises two rectangular pole pieces disposed on either side of the rectangular winding and centered on the spindle axis to which they are perpendicular, and a permanent magnet having two poles of different polarities and respectively connected to said pole pieces the outline of which reproduces the rectangular outline of said winding.

9. A movement, according to claim 8, wherein the permanent magnet has the shape of an open ring the two poles of which are connected to the two pole pieces which are disposed along the gap separating the open ring terminals, whereby the movement may be used for a wrist-watch.

10. A movement according to claim 1, wherein the electric source of current is a direct current source and wherein the stationary closed magnetic circuit comprises two rectangular pole pieces disposed on either side of the rectangular winding and centered on the spindle axis to which they are perpendicular, and a permanent magnet having two poles of different polarities and respectively connected to said pole pieces the outline of which reproduces the rectangular outline of said winding, said permanent magnet having the shape of an open ring defining a gap along which the two pole pieces are disposed, whereby the movement may be used for a wrist-watch.

11. A movement according to claim 1, wherein the electric source of current is a direct current source and wherein the stationary closed magnetic circuit comprises a permanent magnet having the shape of an open ring the ends of which form two poles of the same polarity, said magnet having an intermediate consequent pole of reversed polarity, a rectangular pole piece interconnecting the two ends of said permanent magnet and having an outline reproducing the rectangular outline of said winding, and a branch piece secured on the part of said permanent magnet forming the consequent pole, diametrally directed with respect to said pole piece and ending by a rectangular portion which reproduces the shape of said pole piece and is aligned with said pole piece, said pole piece and rectangular portion being disposed on either side of the rectangular winding and centered on the spindle axis to which they are perpendicular, said branch piece having a central hole through which passes the minute shaft, whereby the movement may be used for a wrist-watch.

12. A movement according to claim 1, wherein the electric source of current is a direct current source and wherein the stationary closed magnetic circuit comprises a permanent magnet substantially having the shape of a Geneva cross, two opposed branches of said magnet having rectangular outlines respectively reproducing the terminal rectangular outlines of the winding, end main poles of the same polarity and being centered on the static equilibrium axis, the other two branches of said magnet having end auxiliary poles of the same polarity but reversed to that of said main poles and an outline so determined that the rectangular winding penetrates the flux generated by said auxiliary poles before its de-energization, said permanent magnet being centered on the spindle axis to which it is perpendicular and disposed on one side of the rectangular winding; and on the other side of said winding an element adapted to close the flux generated by said main and auxiliary poles and having the same outline as said magnet.

13. A movement according to claim 1, wherein the electric source of current is an alternating current source and wherein the stationary closed magnetic circuit comprises an electromagnet having an energizing coil and a laminated frame formed with two rectangular pole-pieces respectively disposed perpendicular to the spindle axis on either side of the winding with their great axis parallel to the static equilibrium axis, said rectangular pole pieces having an outline reproducing the rectangular outline of said winding and being formed with notches through which the spindle passes, and means respectively connecting said source with said winding and coil for maintaining in opposition the electromagnet flux and the winding flux when the great axis of said rectangular winding passes through the axis of static equilibrium.

14. A movement according to claim 1, wherein the electric source of current is an alternating current source and wherein the stationary closed magnetic circuit comprises an electromagnet having a laminated frame formed with three parallel legs disposed on one side of the winding with their end faces perpendicular to the spindle axis, and an energizing coil mounted on the central leg, the free face of said central leg having a rectangular outline which reproduces that of said winding with its great axis perpendicular to the common axis of said three faces and coinciding with the static equilibrium axis, on the other side of said winding a laminated soft-iron armature having the same outline that the general outline of said three legs, and means respectively connecting said source with said winding and coil for maintaining in opposition the electromagnet flux and the winding flux when the great axis of said rectangular winding passes through the axis of static equilibrium.

15. In a movement for electric time pieces, such as clocks and watches, of the type in which a pivoted driving spindle, connected to a spiral spring and carrying a balance wheel and a frame-coil movable in a magnetic field so that its winding cuts across the flux thereof, is caused to oscillate by impulses of electric current in the winding generated by the periodic closing of a supply circuit for said winding, the movement of said spindle being changed to an intermittent motion of constant direction in the time piece by any known means; the improvement which comprises, in combination, a frame-coil consisting of a single flat coil of elongated rectangular configuration, the winding of which is disposed in a plane perpendicular to the driving spindle while its center of symmetry and of gravity is located on the axis of said spindle, and a non-metallic frame secured on said spindle and carrying said winding; an electric current source, means for connecting the two ends of said winding to the same pole of said electric current source during a short fraction of the oscillation period of said winding in both directions of oscillation very close in advance to the time when the greater axis of said rectangular winding coincides with the axis of static equilibrium of said balance wheel for which no torsional moment is impressed to the spiral spring; and a stationary closed magnetic circuit the outline of which reproduces at least in one of its parts the rectangular outline of said winding and through the gap of which said winding oscillates within its proper plane, said magnetic circuit having through said axis of static equilibrium a magnetic flux the direction of which is opposite to that of the electromagnetic flux generated by the energized coil and through an axis at right angles to said static equilibrium axis and to the spindle a magnetic flux so directed that the total flux passing through said energized coil in the direction of its electromagnetic flux when moving away from the static equilibrium position is increased.

References Cited in the file of this patent

UNITED STATES PATENTS 2,986,683      Lavet _____ May 30, 1961